United States Patent
Jo et al.

(10) Patent No.: US 10,340,488 B2
(45) Date of Patent: Jul. 2, 2019

(54) BATTERY PACK

(71) Applicant: LG Chem, Ltd., Seoul (KR)

(72) Inventors: Sang-Hyun Jo, Daejeon (KR); In-Jae Gang, Daejeon (KR); Ki-Youn Kim, Daejeon (KR); Jin-Kyu Shin, Daejeon (KR); Bum-Hyun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 3 days.

(21) Appl. No.: 15/799,341

(22) Filed: Oct. 31, 2017

(65) Prior Publication Data

US 2018/0123097 A1     May 3, 2018

(30) Foreign Application Priority Data

Nov. 2, 2016  (KR) .................. 10-2016-0145253

(51) Int. Cl.
| | |
|---|---|
| *B65D 43/16* | (2006.01) |
| *B65D 43/22* | (2006.01) |
| *B65D 85/30* | (2006.01) |
| *H01M 2/10* | (2006.01) |
| *H01M 2/34* | (2006.01) |

(52) U.S. Cl.
CPC ........ *H01M 2/1077* (2013.01); *B65D 43/163* (2013.01); *B65D 43/22* (2013.01); *B65D 85/30* (2013.01); *H01M 2/1022* (2013.01); *H01M 2/34* (2013.01); *H01M 2200/00* (2013.01); *H01M 2220/20* (2013.01)

(58) Field of Classification Search
CPC .... H01M 2/1077; H01M 2/1022; H01M 2/34; H01M 2200/00; H01M 2220/20; B65D 85/30; B65D 43/163; B65D 43/22
See application file for complete search history.

(56) References Cited

U.S. PATENT DOCUMENTS

| | | | | |
|---|---|---|---|---|
| 5,848,719 A | * | 12/1998 | Goldenberg | ........ H01M 2/1022 220/326 |
| 2002/0168566 A1 | * | 11/2002 | Ohtsuka | ................ H01M 2/043 429/175 |
| 2009/0246610 A1 | * | 10/2009 | Shi | ...................... H01M 2/1066 429/100 |

(Continued)

FOREIGN PATENT DOCUMENTS

| | | |
|---|---|---|
| JP | 2016-143554 A | 8/2016 |
| JP | 2016143554 A * | 8/2016 .............. H01M 2/10 |

(Continued)

OTHER PUBLICATIONS

English Translation of KR 20030030766 A, Published 2003.*
English Translation of JP 2016143554 A, Published 2016.*
English Translation of KR 20120001325 A, Published 2012.*

*Primary Examiner* — Stewart A Fraser

(74) *Attorney, Agent, or Firm* — Morgan, Lewis & Bockius LLP

(57) ABSTRACT

Disclosed is a battery pack, which includes a battery module having a plurality of battery cells, a case configured to accommodate a plurality of the battery modules, and a protection cover coupled to the case to be capable of opening or closing, the protection cover being configured to protect an installation member installed at the case, wherein the protection cover is pivotally coupled to the case and is separable from the case depending on a pivoting angle of the protection cover.

8 Claims, 9 Drawing Sheets

(56) References Cited

U.S. PATENT DOCUMENTS

| | | | | |
|---|---|---|---|---|
| 2010/0039757 A1* | 2/2010 | Yu | ........................ | H01M 2/1066 |
| | | | | 361/679.01 |
| 2010/0092847 A1* | 4/2010 | Li | ........................ | H01M 2/1066 |
| | | | | 429/97 |
| 2011/0300416 A1 | 12/2011 | Bertness | | |
| 2015/0207130 A1* | 7/2015 | Maguire | ............. | H01M 2/1083 |
| | | | | 429/97 |
| 2015/0249235 A1* | 9/2015 | Kawashima | ......... | H01M 2/1022 |
| | | | | 429/100 |
| 2016/0260961 A1* | 9/2016 | Lee | ........................ | H01M 2/345 |
| 2016/0336577 A1 | 11/2016 | Eom et al. | | |

FOREIGN PATENT DOCUMENTS

| | | | | | |
|---|---|---|---|---|---|
| KR | 20120001325 A | * | 1/2012 | ............. | B60R 16/02 |
| KR | 10-2012-0001325 A | | 2/2012 | | |
| KR | 10-2013-0030766 A | | 3/2013 | | |
| KR | 20130030766 A | * | 3/2013 | ............ | B60L 3/0046 |
| KR | 20150086925 A | | 7/2015 | | |

* cited by examiner

BATTERY PACK

TECHNICAL FIELD

The present application claims priority to Korean Patent Application No. 10-2016-0145253 filed on Nov. 2, 2016 in the Republic of Korea, the disclosures of which are incorporated herein by reference.

The present disclosure relates to a battery pack, and more particularly, to a battery pack capable of conveniently operating an installation member installed at a case.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator and an electrolyte interposed therebetween. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

Generally, a secondary battery has a module structure in which unit battery cells are stacked, and a plurality of battery modules may be stacked to configure a battery pack. The battery pack may be used as an energy storage device and is configured to prevent the danger caused by external physical factors and satisfy installation environment and installation conditions. The battery pack may be used for a variety of purposes such as home or industrial applications.

Here, various kinds of installation members such as a battery circuit breaker may be installed at a case of the secondary battery. However, if the case coupled by bolts or the like is entirely separated for operating the installation member, the maintenance is not easy since a lot of working time is needed.

RELATED LITERATURES

Patent Literature

Korean Unexamined Patent Publication No. 10-2015-0086925 (published on Jul. 29, 2015)

DISCLOSURE

Technical Problem

The present disclosure is directed to providing a battery pack, which may operate various installation members installed at a case in a convenient and easy way.

Also, the present disclosure is directed to providing a battery pack, which may operate an installation member conveniently without any separate working tool.

Technical Solution

In one aspect of the present disclosure, there is provided a battery pack, comprising: a battery module having a plurality of battery cells; a case configured to accommodate a plurality of the battery modules; and a protection cover coupled to the case to be capable of opening or closing, the protection cover being configured to protect an installation member installed at the case, wherein the protection cover is pivotally coupled to the case and is separable from the case depending on a pivoting angle of the protection cover.

In addition, a coupling groove may be formed at the case, and a coupling protrusion pivotally coupled to the coupling groove may be formed at the protection cover, and the protection cover may be pivotally coupled to the case by coupling the coupling protrusion and the coupling groove, so that the protection cover is separated the case from within a preset angle range but the protection cover is prevented from being separated due to the interference of the protection cover and the case at an angle beyond the preset angle range.

Moreover, a first protruding portion may be formed at the protection cover and be configured to protrude from the protection cover at a location near the coupling protrusion to come into contact with the case and thus interfere with the case when the protection cover is separated at an angle beyond the preset angle range.

In addition, a second protruding portion may be formed at the case to protrude the case to come into contact with the first protruding portion.

Moreover, an insert groove may be formed at a location near the coupling groove so that the first protruding portion is inserted therein when the protection cover is pivoted, in order to prevent the protection cover from being pivoted beyond a preset range.

In addition, the protection cover may include a first cover member at which the coupling protrusion is formed and a second cover member bent and extending from the first cover member, and the second cover member may be configured to come into contact with the case and thus interfere with the case when the protection cover is separated at an angle beyond the preset angle range.

Moreover, the protection cover may be coupled to the case by means of a latch member.

In another aspect of the present disclosure, there is also provided a vehicle, comprising the battery pack.

Advantageous Effects

According to the embodiments of the present disclosure, a protection cover coupled to the case may be opened by means of a latch member, and the protection cover may be separated from the case by pivoting the protection cover by means of a coupling protrusion and a coupling groove. Thus, various installation members installed at the case may be operated conveniently and easily.

In addition, the protection cover may be opened or separated without any separate working tool, and thus the installation member may be operated conveniently.

BEST MODE

Figure 1:
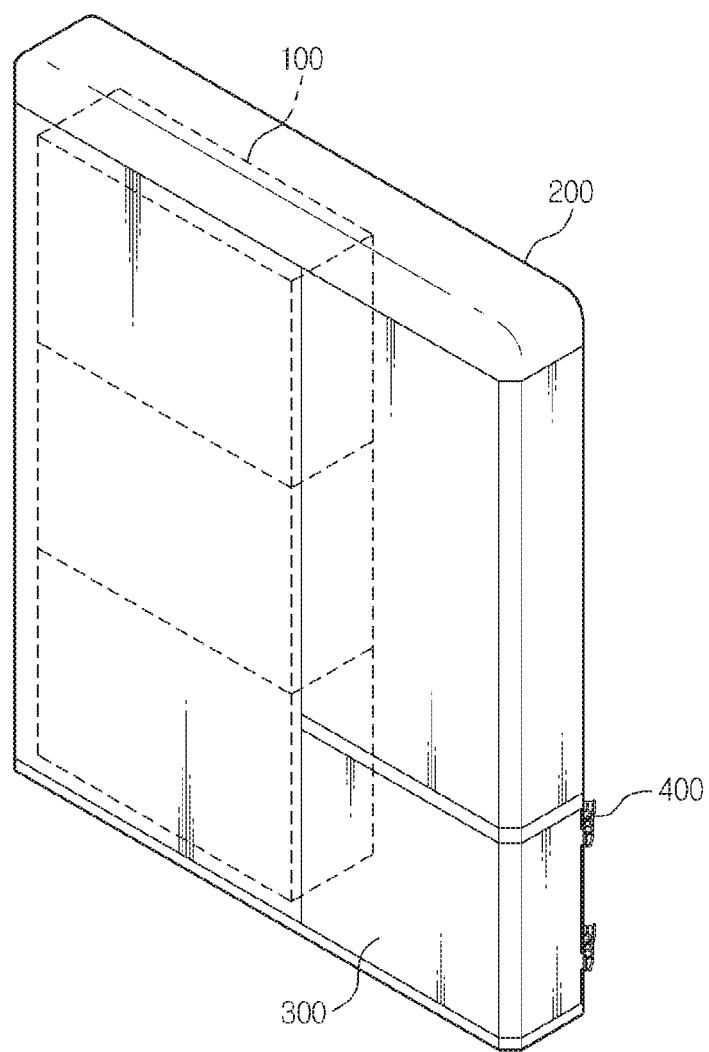
FIG. 1 is a perspective view showing a battery pack according to an embodiment of the present disclosure as a whole.

Hereinafter, a battery pack according to an embodiment of the present disclosure will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
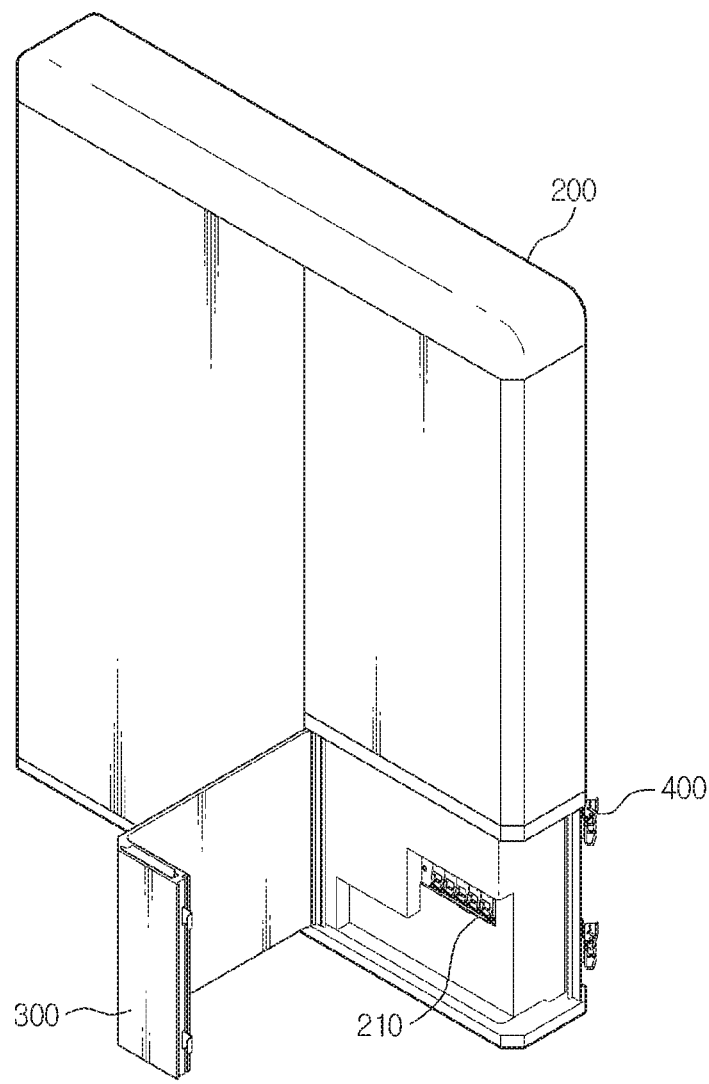
FIG. 2 is a perspective view showing that a protection cover is opened at the battery pack according to an embodiment of the present disclosure.
Figure 3:
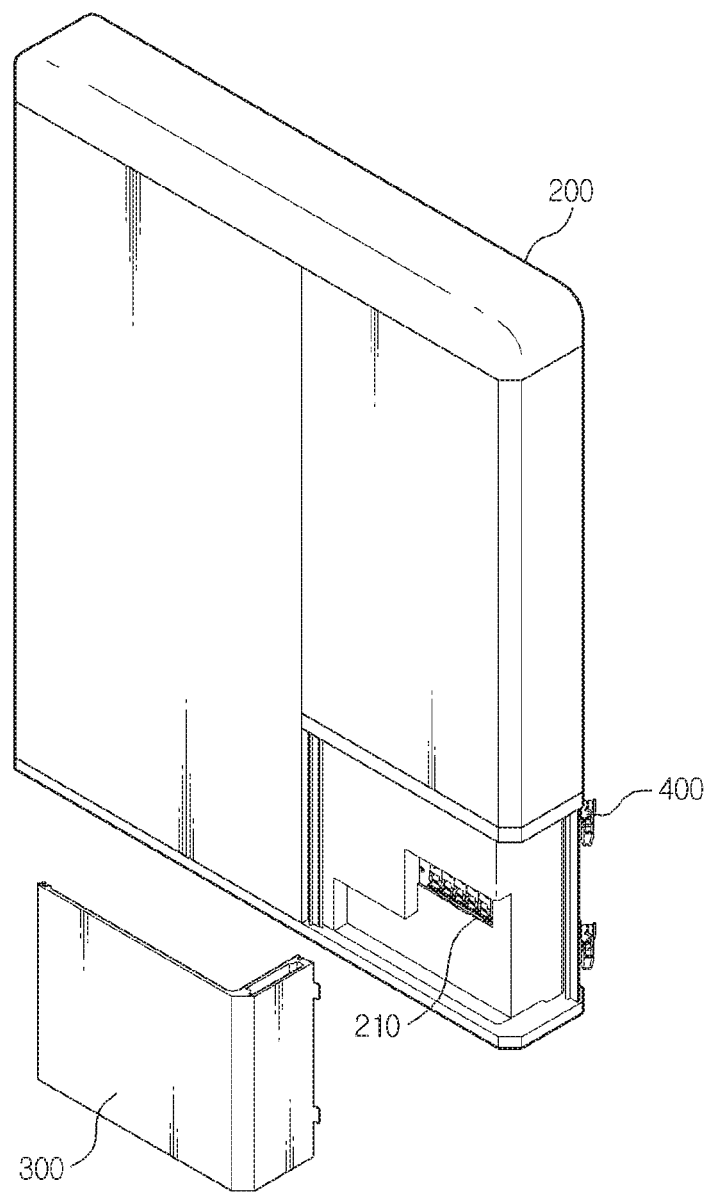
FIG. 3 is a perspective view showing that the protection cover is separated from the battery pack according to an embodiment of the present disclosure.

FIG. 1 is a perspective view showing a battery pack according to an embodiment of the present disclosure as a whole, FIG. 2 is a perspective view showing that a protection cover is opened at the battery pack according to an embodiment of the present disclosure, and FIG. 3 is a perspective view showing that the protection cover is separated from the battery pack according to an embodiment of the present disclosure.

Referring to FIGS. 1 to 3, a battery pack 10 according to an embodiment of the present disclosure may include a battery module 100, a case 200 and a protection cover 300. In addition, the battery pack 10 may include various devices for controlling charge/discharge of the battery module 100, such as BMS, a current sensor, a fuse and the like.

The battery module 100 may include a plurality of battery cells. The battery cell may have various structures, and a plurality of battery cells may be stacked in various ways. The battery cell may be configured so that a plurality of unit cells, in which a positive electrode plate, a separator and a negative electrode plate are arranged in order, or a plurality of bi-cells, in which a positive electrode plate, a separator, a negative electrode plate, a separator, a positive electrode plate, a separator and a negative electrode plate are arranged in order, are stacked. In addition, the battery cell may have electrode leads. The electrode leads are a kind of terminals exposed to the outside and connected to an external device and may be made of conductive material. The electrode leads may include a positive electrode lead and a negative electrode lead. The positive electrode lead and the negative electrode lead may be disposed in opposite directions with respect to the length direction of the battery cell, or the positive electrode lead and the negative electrode lead may be located at the same direction with respect to the length direction of the battery cell. Meanwhile, the battery module 100 may include a plurality of cartridges for accommodating the battery cells. Each cartridge may be produced by injection-molding plastic, and a plurality of cartridges having an accommodation portions for accommodating the battery cell may be stacked. A cartridge assembly in which the plurality of cartridges are stacked may have a connector element or a terminal element. The connector element may include an electric connection part or a connection member of various shapes, for the connection to, for example, a battery management system (BMS, not shown) or the like which may provide data such as voltage and temperature of the battery cell. In addition, the terminal element includes a positive electrode terminal and a negative electrode terminal as main terminals connected to the battery cell, and the terminal element may have a terminal bolt for electric connection to the outside.

The case 200 may accommodate a single battery module 100 or a plurality of battery modules 100. In other words, at least one battery module 100 is stacked at the inside of the case 200, the case 200 surrounds and protects the battery module 100. Namely, the case 200 surrounds the battery module 100 as a whole and thereby protects the battery module 100 against external vibrations or impacts. The case 200 may be formed to have shape corresponding to the battery module 100. For example, if the battery modules 100 are prepared in a hexahedron shape as a whole, the case 200 may also have a hexahedron shape corresponding thereto. For example, the case 200 may be prepared by bending a metal plate, and thereby the case 200 may be prepared integrally. Here, if the case 200 is prepared integrally, the coupling process may be simplified. In other case, the case 200 may be prepared in a separable form and be coupled in various ways such as welding, riveting, bolding, pin coupling, bracketing, moment bonding or the like.

As shown in FIGS. 1 and 2, the protection cover 300 is coupled to the case 200 to be capable of opening or closing and protects an installation member installed at the case 200. Here, the installation member includes various electronic, electric and mechanical devices which may be installed at the case 200, and, for example, may include a battery leakage circuit breaker 210, a battery discharge circuit breaker 210 and the like. The installation member needs to be operated, repaired or exchanged by a user, if required. In the battery pack 10 according to an embodiment of the present disclosure, since the protection cover 300 is pivotally coupled to the case 200 and may be separable from the case 200 depending on the pivoting angle of the protection cover 300, the installation member may be operated, repaired or exchanged after opening the protection cover 300 or separating the protection cover 300 from the case 200. This will be explained in detail later. Meanwhile, in the following description, the installation member is regarded as the circuit breaker 210 for convenience.

A latch member 400 may employ various kinds of members, which may couple the protection cover 300 to the case 200, and for example, a hooking ring and a hooking protrusion may be used to couple the protection cover 300 to the case 200 as shown in FIGS. 1 to 3.

Figure 4:
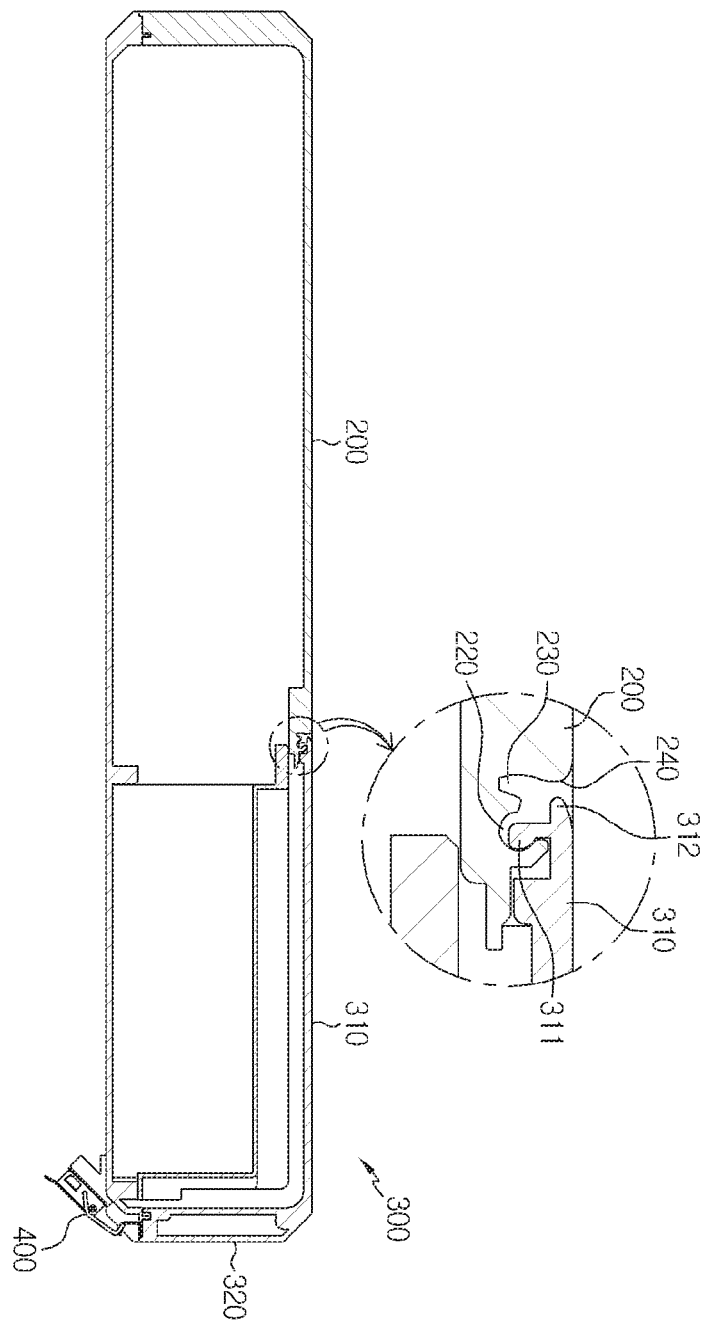
FIG. 4 is a cross-sectioned view showing that the protection cover is closed at the battery pack according to an embodiment of the present disclosure.
Figure 5:
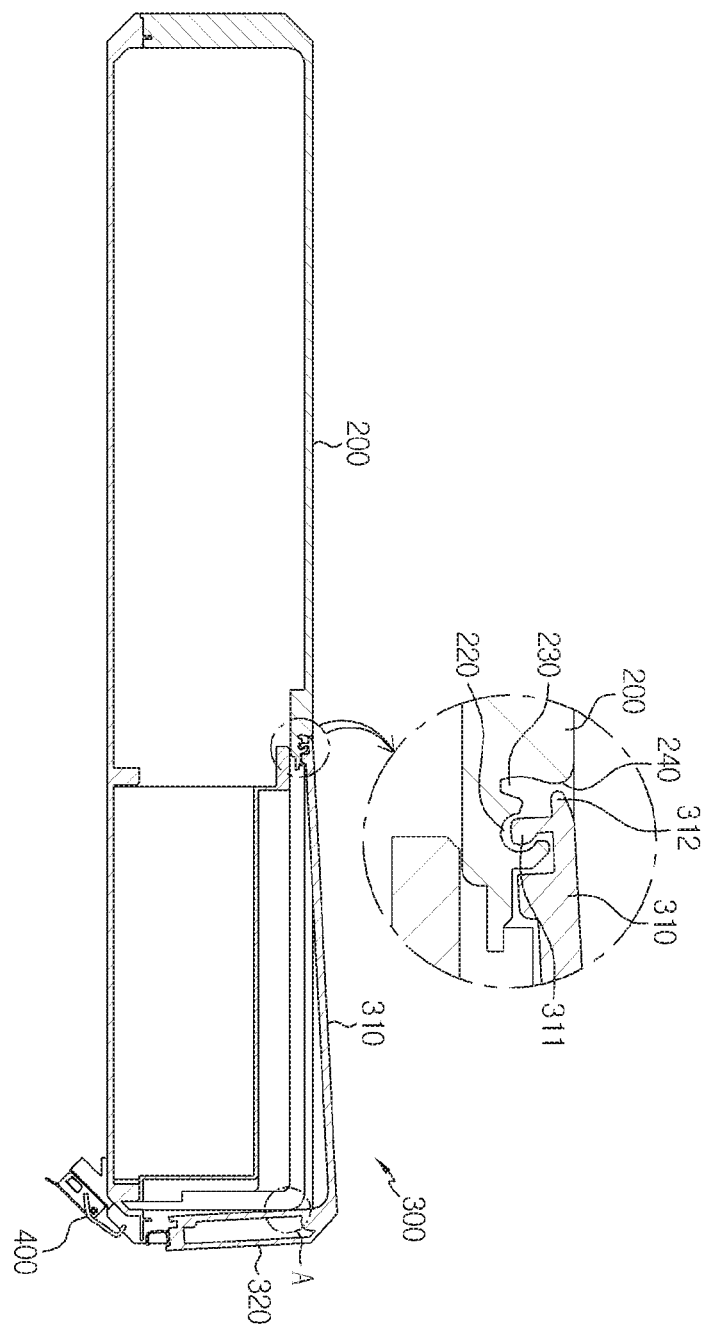
FIG. 5 is a cross-sectioned view showing an embodiment in which the protection cover is pivoted to an angle beyond a separable angle range at the battery pack according to an embodiment of the present disclosure.
Figure 6:
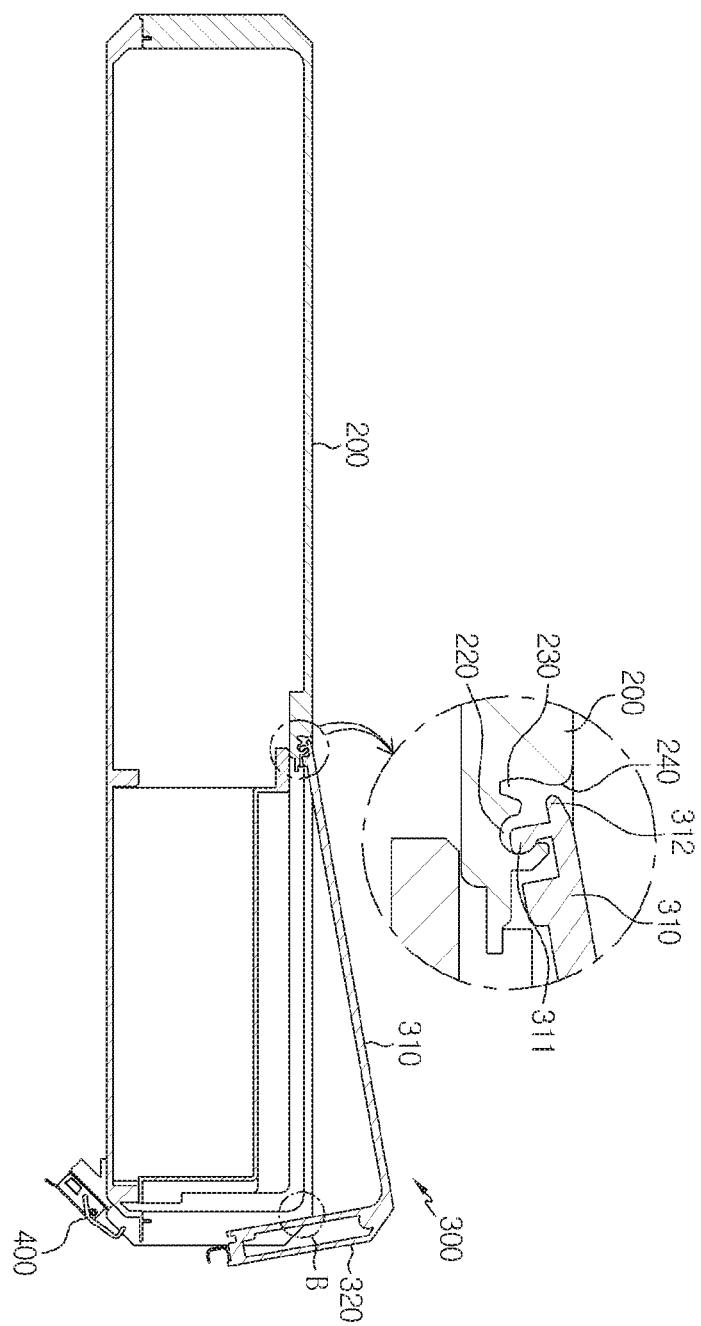
FIGS. 6 to 8 are cross-sectioned views for illustrating a process in which the protection cover is pivoted to a separable angle and thus separated from the case at the battery pack according to an embodiment of the present disclosure.
Figure 7:
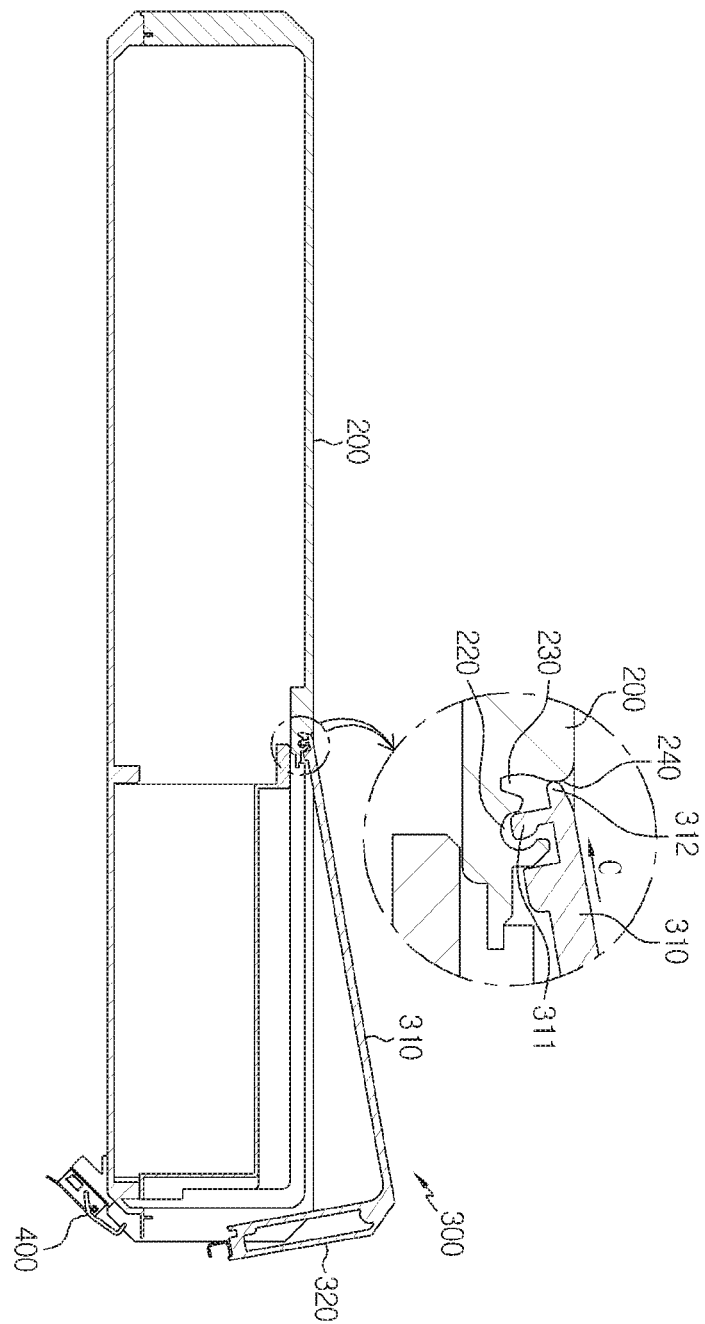
Figure 8:
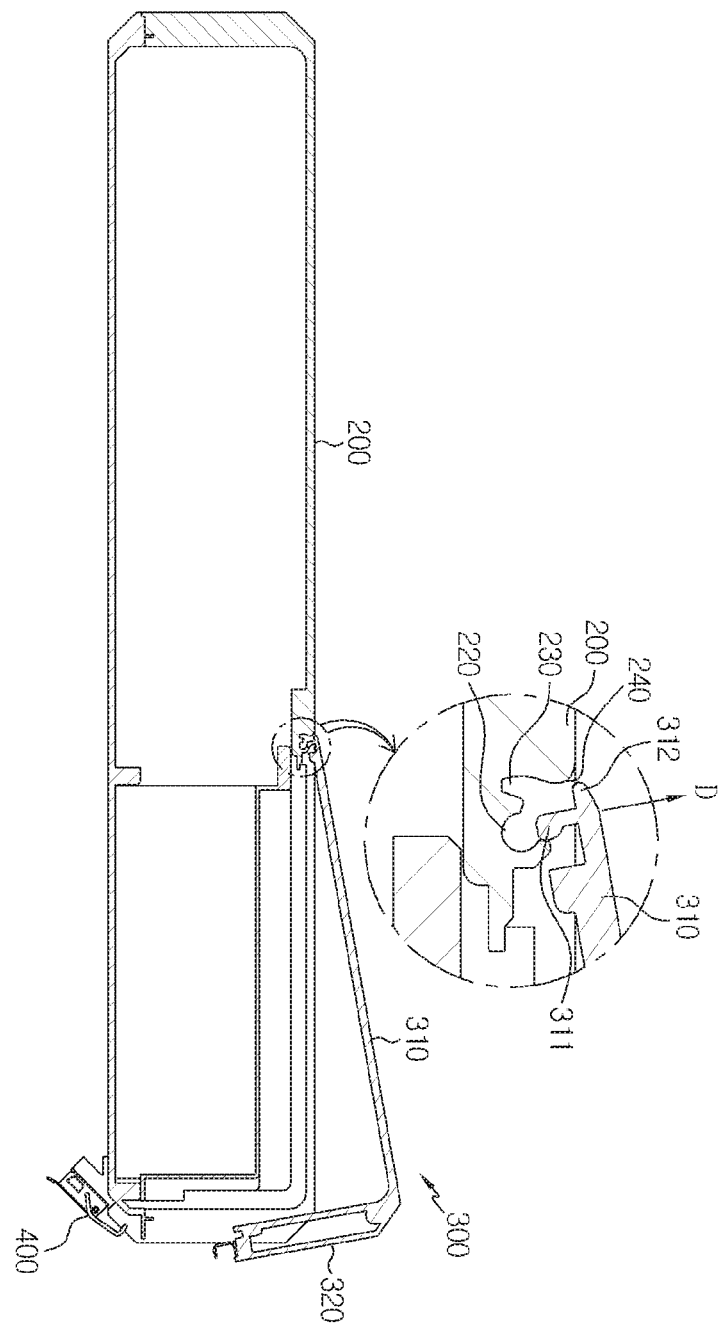
Figure 9:
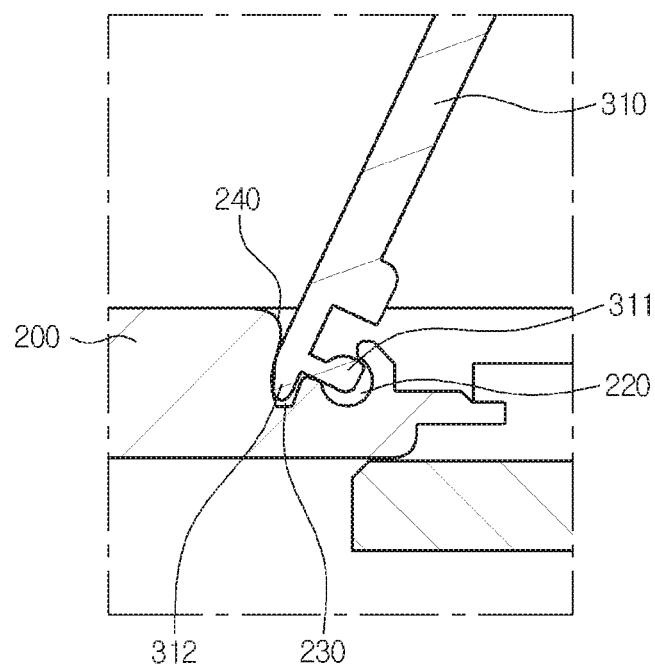
FIG. 9 is a cross-sectioned view showing another embodiment in which the protection cover is pivoted to an angle beyond a separable angle range at the battery pack according to an embodiment of the present disclosure.

FIG. 4 is a cross-sectioned view showing that the protection cover is closed at the battery pack according to an embodiment of the present disclosure, FIG. 5 is a cross-sectioned view showing an embodiment in which the protection cover is pivoted to an angle beyond a separable angle range at the battery pack according to an embodiment of the present disclosure, FIGS. 6 to 8 are cross-sectioned views for illustrating a process in which the protection cover is pivoted to a separable angle and thus separated from the case at the battery pack according to an embodiment of the present disclosure, and FIG. 9 is a cross-sectioned view showing another embodiment in which the protection cover is pivoted to an angle beyond a separable angle range at the battery pack according to an embodiment of the present disclosure.

Referring to FIGS. 4 to 9, a coupling groove 220 may be formed at the case 200, and a coupling protrusion 311 pivotally coupled to the coupling groove 220 may be formed at the protection cover 300. In other words, as the coupling protrusion 311 formed at the protection cover 300 is coupled to the coupling groove 220 formed at the case 200 and then is pivoted, the protection cover 300 may be opened or closed with respect to the case 200.

Namely, the protection cover 300 may be configured to be pivotal with respect to the case 200 by coupling the coupling protrusion 311 and the coupling groove 220. Here, if the protection cover 300 is pivoted within a preset angle range with respect to the case 200, the protection cover 300 may be separated from the case 200. However, if the protection cover 300 is pivoted at an angle beyond the preset angle range with respect to the case 200, the protection cover 300 is not separated from the case 200 due to the interference of the protection cover 300 and the case 200.

Referring to FIG. 4, the protection cover 300 is coupled to the case 200, and because the protection cover 300 is coupled to the case 200 by means of the latch member 400, the protection cover 300 may close the case 200.

Referring to FIG. 5, the protection cover 300 may include a first cover member 310 and a second cover member 320. The coupling protrusion 311, explained later, may be formed at the first cover member 310, and a second cover member 320 may be bent and extend from the first cover member 310. In addition, if the protection cover 300 is separated at an angle beyond the preset angle range, the second cover member 320 comes into contact with the case 200 to interfere therewith, and thus it is possible to prevent the protection cover 300 from being separated. Referring to FIG. 5, when the protection cover 300 is pivoted at angle beyond the preset angle range, namely, for example, when the protection cover 300 is pivoted at angle of 3° based on a virtual horizontal surface, if the protection cover 300 is moved in a C direction of FIG. 7, the second cover member 320 collides and interferes with the case 200 at an A portion of FIG. 5, and thus the protection cover 300 is prevented from being separated from the case 200.

Referring to FIG. 6, when the protection cover 300 is pivoted within the preset angle range, namely, for example, when the protection cover 300 is pivoted at an angle of 10° based on a virtual horizontal surface, since the protection cover 300 and the case 200 are separated at a B portion of FIG. 6, the protection cover 300 does not interfere with the case 200 even though the protection cover 300 is moved in the C direction of FIG. 7. In addition, if the protection cover 300 moves in the C direction of FIG. 7 so that the coupling protrusion 311 of the first cover member 310 moves from the coupling groove 220 of the case 200, as shown in FIG. 8, the protection cover 300 may be separated from the case 200 by moving the protection cover 300 in a D direction of FIG. 8. In addition, the protection cover 300 may also be attached to the case 200 by performing the process of separating the protection cover 300 in a reverse order. By doing so, the protection cover 300 may be separated within a preset angle range, and the protection cover 300 may be prevented from being separated but be pivoted at an angle beyond the preset angle range. Here, the preset angle range may be variously selected depending on the size and shape of the protection cover 300 and the kind of the circuit breaker 210 installed at the case 200. In addition, the protection cover 300 may also be configured to be separable from the case 200 at a specific angle, instead of a preset angle range. For example, the preset angle range within which the protection cover 300 is separable from the case 200 may be 10° to 13°, but, for example, it is also possible that the protection cover 300 is separable from the case 200 just at a single angle, for example 10°.

Referring to FIG. 9, a first protruding portion 312 protruding from the protection cover 300 at a location near the coupling protrusion 311 in order to prevent the protection cover 300 from being separated at an angle beyond the preset angle range may be formed at the protection cover 300. In addition, a second protruding portion 240 protruding from the case 200 to come into contact with the first protruding portion 312 may be formed at the case 200. For example, when the preset angle range within which the protection cover 300 is separable from the case 200 is 10° to 13°, if the protection cover 300 is pivoted by 65° based on a virtual horizontal surface and then the protection cover 300 moves in the C direction of FIG. 7, as shown in FIG. 9, the first protruding portion 312 protruding from the protection cover 300 comes into contact with the second protruding portion 240 protruding from the case 200 to interfere therewith, and accordingly it is prevented that the protection cover 300 is separated from the case 200. Meanwhile, an insert groove 230 may be formed at a location near the coupling groove 220 in order to prevent the protection cover 300 from being pivoted beyond a preset range. In other words, if the protection cover 300 is pivoted by a preset angle, for example 65° based on a virtual horizontal surface, the first protruding portion 312 is inserted into the insert groove 230 and comes into contact therewith, and thus the protection cover 300 is not able to be pivoted at an angle beyond 65°. However, 65° is just an example, and the pivoting angle of the protection cover 300 may be selected variously.

Meanwhile, height-adjustable bolts may be coupled to the protection cover 300. For example, if the heights of the protection cover 300 and the case 200 are not in agreement due to a processing error or a coupling error of the protection cover 300, a step may be formed. In this case, the height difference between the protection cover 300 and the case 200 may be adjusted by fastening or releasing the bolts coupled to the protection cover 300. In addition, these bolts may also be coupled to the case 200 as well as the protection cover 300.

Hereinafter, the operation and effects of the battery pack 10 according to an embodiment of the present disclosure will be described.

Various kinds of circuit breakers 210 may be coupled to the battery pack 10, and a user may need to directly operate the circuit breaker 210 if required. At this time, if the user should entirely separate the case 200 of the battery pack 10 coupled by bolts or the like, a lot of time is needed, and the separating work may not be easy. However, in the battery pack 10 according to an embodiment of the present disclosure, the circuit breaker 210 may be operated or manipulated in a simple way by pivoting the protection cover 300 coupled to the case 200. Also, if the protection cover 300 needs to be separated for repairing or exchanging the circuit breaker 210, the protection cover 300 may be separated from the case 200 by being pivoted at a separable angle.

For example, when the protection cover 300 is entirely opened as shown in FIG. 9, the first protruding portion 312 of the protection cover 300 is inserted into the insert groove 230 of the case 200 and comes into contact with the second protruding portion 240 of the case 200, it is prevented that the protection cover 300 is separated. In other words, as shown in FIG. 9, after the protection cover 300 is opened entirely, the circuit breaker 210 or the like may be operated.

In addition, the protection cover 300 may be separated from the case 200 by pivoting the protection cover 300 at a separable angle as in FIG. 6, then moving the protection cover 300 in the C direction as in FIG. 7, and then moving the protection cover 300 in the D direction as in FIG. 8. By doing so, the circuit breaker 210 or the like may be exchanged or repaired.

However, if the protection cover 300 is pivoted at an angle smaller than the separable angle as shown in FIG. 5, the second cover member 320 comes into contact with the case 200 and thus interfere therewith (see the A portion of FIG. 5), and thus it is possible to prevent that the protection cover 300 is separated.

By doing so, the protection cover 300 may be opened or separated without using any separate working tool, and thus the installation member may be operated conveniently.

Meanwhile, a vehicle (not shown) according to an embodiment of the present disclosure may include the battery pack 10 described above, and the battery pack 10 may include the battery module 100. In addition, the battery pack 10 according to an embodiment of the present disclosure may be applied to the vehicle (not shown), for example a predetermined vehicle (not shown) using electricity such as an electric vehicle and a hybrid vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 10: battery pack | 100: battery module |
| 200: case | 210: circuit breaker |
| 220: coupling groove | 230: insert groove |
| 240: second protruding portion | 300: protection cover |
| 310: first cover member | 311: coupling protrusion |
| 312: first protruding portion | 320: second cover member |
| 400: latch member | |

What is claimed is:

1. A battery pack, comprising:
   a case configured to accommodate a plurality of battery modules, each of the plurality of battery modules including a plurality of battery cells;
   at least one of the plurality of battery modules; and
   a protection cover coupled to the case and configured to be capable of opening or closing, the protection cover being further configured to protect an installation member installed in the case,
   wherein the protection cover is pivotally coupled to the case,
   wherein the protection cover is separable from the case, depending on a pivoting angle of the protection cover, and
   wherein the at least one of the plurality of battery modules is in the case.

2. The battery pack according to claim 1, wherein:
   a coupling groove is in the case;
   a coupling protrusion pivotally coupled to the coupling groove is in the protection cover; and
   the protection cover is pivotally coupled to the case by coupling the coupling protrusion and the coupling groove, so that the protection cover is separated from the case within a preset angle range, and
   the protection cover is prevented from being separated due to interference of the protection cover and the case at an angle beyond the preset angle range.

3. The battery pack according to claim 2, wherein a first protruding portion is in the protection cover and is configured to protrude from the protection cover at a location near the coupling protrusion to come into contact with the case, and thus interfere with the case when the protection cover is separated at an angle beyond the preset angle range.

4. The battery pack according to claim 3, wherein a second protruding portion protrudes from the case and is configured to come into contact with the first protruding portion.

5. The battery pack according to claim 3, further comprising an insert groove near the coupling groove, the insert groove being configured so that the first protruding portion is inserted therein when the protection cover is pivoted to prevent the protection cover from being pivoted beyond a preset range.

6. The battery pack according to claim 2, wherein:
   the protection cover includes:
     a first cover member including the coupling protrusion; and
     a second cover member bent and extending from the first cover member; and
   the second cover member is configured to come into contact with the case, and thus interfere with the case when the protection cover is separated at an angle beyond the preset angle range.

7. The battery pack according to claim 1, wherein the protection cover is coupled to the case by a latch member.

8. A vehicle, comprising the battery pack of claim 1.

\* \* \* \* \*